W. O. AND J. R. KING.
MACHINE FOR SPREADING CRUSHED STONE AND OTHER MATERIAL.
APPLICATION FILED JULY 6, 1918.
1,376,944.
Patented May 3, 1921.
3 SHEETS—SHEET 2.
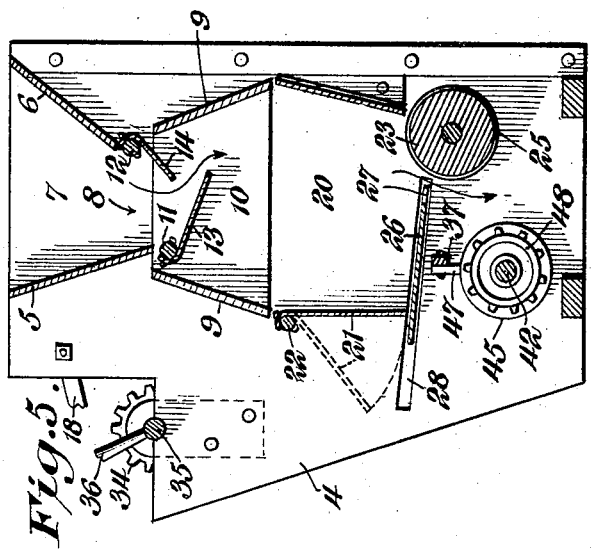
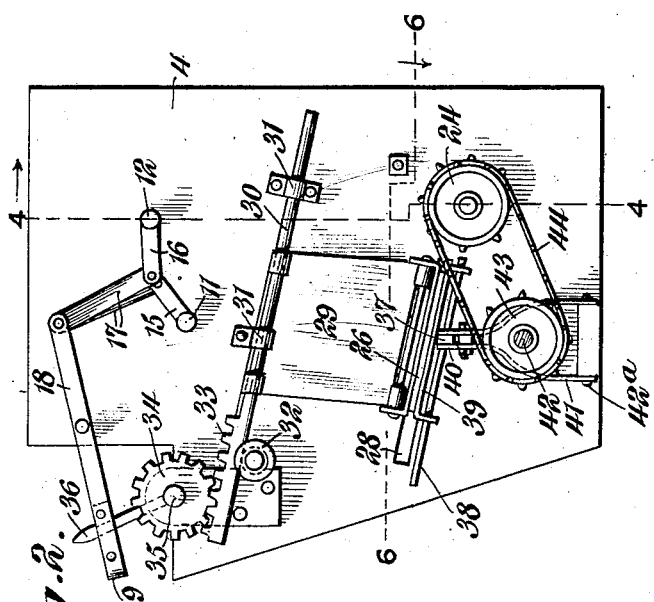
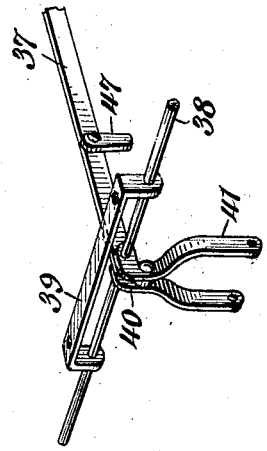
WITNESSES
Jas. K. McCathran
F. T. Chapman
William O. King,
Joshua R. King, INVENTORS
BY
E. G. Siggers
ATTORNEY

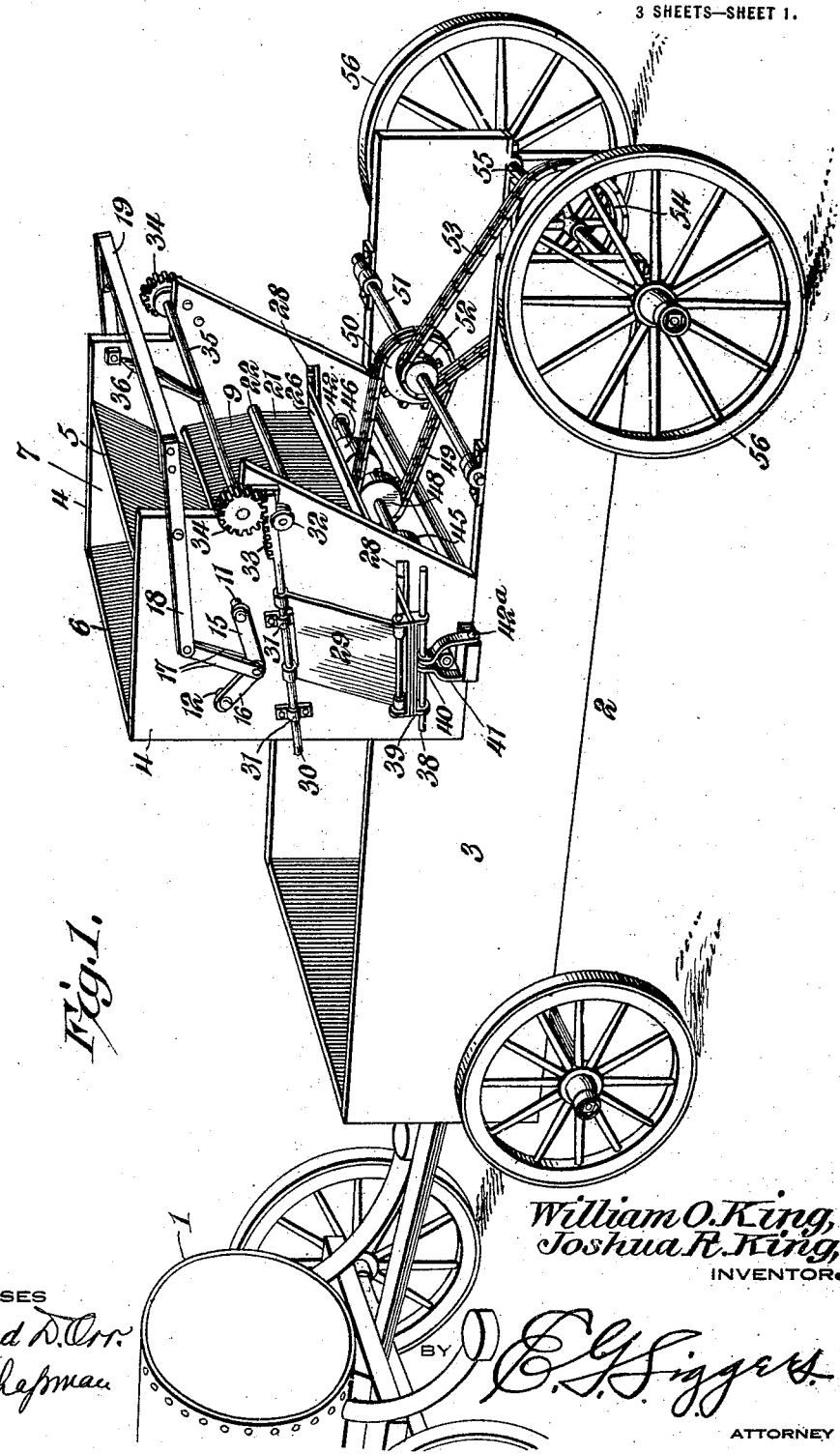

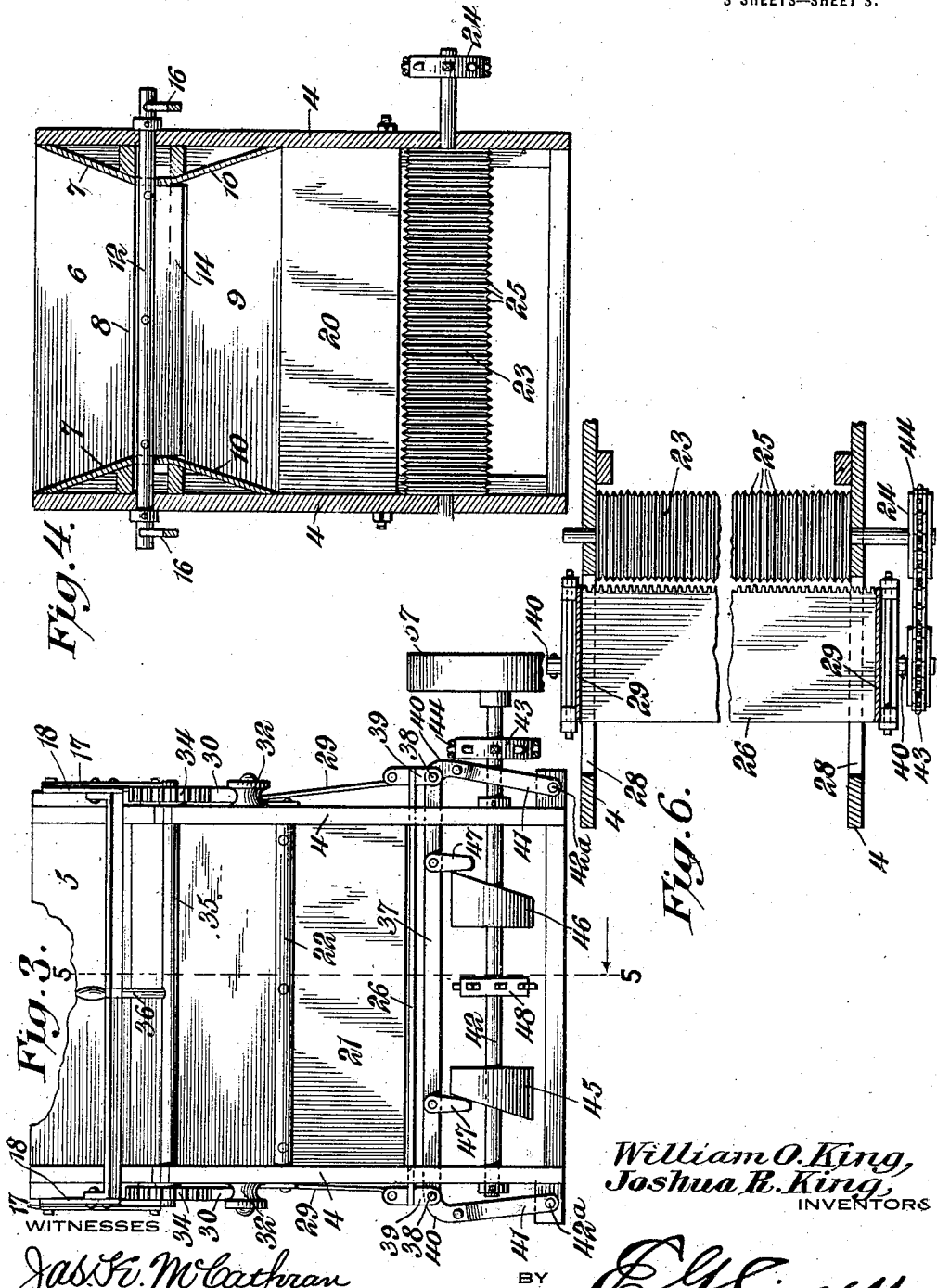

UNITED STATES PATENT OFFICE.

WILLIAM O. KING, OF SIDNEY, AND JOSHUA R. KING, OF NEW HAVEN, NEW YORK.

MACHINE FOR SPREADING CRUSHED STONE AND OTHER MATERIAL.

1,376,944.      Specification of Letters Patent.      Patented May 3, 1921.

Application filed July 6, 1918. Serial No. 243,542.

*To all whom it may concern:*

Be it known that we, WILLIAM O. KING and JOSHUA R. KING, citizens of the United States, residing, respectively, at Sidney and New Haven, in the respective counties of Delaware and Oswego and State of New York, have invented a new and useful Machine for Spreading Crushed Stone and Other Material, of which the following is a specification.

This invention has reference to a machine for spreading crushed stone and other material, and its object is to provide a machine for the even spreading of crushed stone or other dressing for roadways upon which a layer of tar or oil has been deposited.

In accordance with the invention, there is provided a hopper structure to be mounted upon a vehicle, which latter may be attached to and follow a tank from which tar or oil is deposited upon a roadway, the hopper having associated therewith appropriate mechanism for distributing and controlling the distribution of crushed stone or other like top dressing.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a perspective view of a vehicle with the invention applied and showing the vehicle attached to and following a suitable tank wagon.

Fig. 2 is a side elevation of the structure embodying the invention but viewed from the side remote from that shown in Fig. 1.

Fig. 3 is a rear end elevation of the structure shown in Fig. 2.

Fig. 4 is a section on the line 4—4 of Fig. 2.

Fig. 5 is a section on the line 5—5 of Fig. 3.

Fig. 6 is a section on the line 6—6 of Fig. 2.

Fig. 7 is a perspective view of a portion of the structure.

Referring to the drawings, there is shown in Fig. 1 a tank vehicle 1 which may be taken as indicative of any suitable tar or oil spreading vehicle such as is commonly used in road construction and repair.

Fast to the vehicle 1 in trailing relation thereto is another vehicle 2 which may have a body 3 of suitable capacity to contain an appropriate quantity of crushed stone, sand or other material used as a top dressing on oiled or tarred roads.

Erected on the body 3 at the sides thereof are upright plates or boards 4 connected by other plates or boards 5, 6 and together with end boards or plates 7 constituting a hopper having a contracted mouth 8 at the lower end. Below the hopper is an expanding member or chute comprising side boards or plates 9 and end boards or plates 10.

Extending through and journaled in the plates or boards 4 and located beneath the lower ends of the hopper members 5 and 6, which members have their lower ends at different levels, are shafts 11, 12, respectively. The shaft 11 carries a shutter 13 and the shaft 12 carries a shutter 14. The shutter 13 is longer than the shutter 14 and are superposed and so related that they may entirely close the mouth 8 of the hopper above them with the shutter 13 underriding and overlapping the shutter 14. The shutters may be moved to separate at their overlapping portions, and, in such case, material is directed by the shutter 14 onto the shutter 13 and by the latter toward one side of the chute 9 below them. The shaft 11 has rock arms 15 fast thereto at opposite ends exterior to the boards or plates 4 and the shaft 12 has similar rock arms 16 at opposite ends. The rock arms are connected by links 17 to the ends of levers 18 pivotally supported on the boards or plates 4, and these levers have the ends remote from those ends connected to the links 17 connected by a bar 19 so that by raising or lowering the bar 19 the shafts 11 and 12 may be simultaneously rocked, causing a similar rocking of the shutters 13 and 14.

Mounted below the chute 10 is another chute 20 having one side 21 pivotally hung from a rod 22 so that the side 21 may be moved about the axis of the rod toward and from the opposite side of the chute. Underlying that side of the chute 20 remote from the side 21 is a roller 23 journaled in the side plates 4 and at one end beyond the corresponding side plate 4 the journal of the roller 23 carries a sprocket wheel 24 by means of which the roller may be driven as will hereinafter appear. The surface of the roller 23 is formed with circumferential teeth or corrugations 25. The roller 23 has associated therewith a plate 26 extending across and forming a part of the bottom of the chute 20, the roller 23 also serving as a part of the bottom of the chute 20. That edge of the plate 26 presented toward the roller 23 is formed with teeth 27. The plate 26 extends at the ends through slots 28 in the side boards or plates 4 and outside of the latter is carried by the lower ends of hangers 29 which, at their upper ends, are each suspended by a rod 30 mounted in guides 31 and in part supported by a roller 32 so that each rod 30 may be moved in the direction of its length. At that end of each rod 30 underridden by the roller 32 is a rack 33 engaged by a pinion 34. Since there are two rods 30, one on the outer face of each board 4, there are also two pinions 34 and these pinions are carried by and fast on a rock shaft 35 appropriately mounted on the boards 4. The rock shaft 35 is under the control of a hand lever 36 whereby the shaft may be rocked, carrying the pinions 34 with it, and correspondingly actuating the rods 30 with which the hangers 39 move. Consequently the plate 26 is correspondingly moved in the direction of its width, bringing the teeth 27 toward or from the roller 23. In this manner there is provided an adjustable throat constituting the discharge portion of the chute 20 and material from the hopper 8 is conveyed to the throat by the shutter 13 when the bottom of the hopper 8 is open, the free edge of the shutter being approximately over the throat between the plate 26 and roller 23.

The plate 26 is longer than the space between the boards or plates 4 and the hangers 29 are so arranged as to permit a longitudinal movement of the plate 26, whereby material reaching the plate 26 is distributed evenly to the roller 23 and caused to pass from the chute 20 in a wide thin stream.

Fast at opposite ends to the corresponding ends of the plate 26 is a rod or bar 37 connected at the ends to rods 38 which in turn are mounted in straps 39 fast to the ends of the plate 26. Each end of the bar 37 is engaged by one end 40 of a respective one of supporting yokes 41 pivotally mounted, as shown at 42, to the lower portion of a respective one of the plates 4 or to other fixed part of the device, the end 40 of the yoke 41 straddling the corresponding end of the bar 37. Journaled in the plates 4 in position to traverse one of the yokes 41 is a shaft 42 carrying exterior to the corresponding plate 4 a sprocket wheel 43 connected by a sprocket chain 44 to the sprocket wheel 24. Mounted on the shaft 42 between the plates 4 are oppositely pitched cams 45, 46 respectively, in position to engage fingers or projections 47 fast to the bar 37. The shaft 42 also carries a sprocket wheel 48 fast thereto and this sprocket wheel is connected by a sprocket chain 49 to another sprocket wheel 50 on a countershaft 51 journaled on the body 3 of the vehicle 2. The shaft 51 also carries a sprocket pinion 52 connected by a sprocket chain 53 to a sprocket wheel 54 on a shaft 55 journaled to the body 3 and constituting one of the axles of the body 2, in the drawings this being shown as the rear axle. The shaft 55 carries ground-engaging wheels 56 which may be so constructed that when the vehicle 2 moves over the ground motion is imparted by the wheels 56, shaft 55, and sprocket gearing 48 to 54 to the shaft 42. This in turn causes a reciprocation of the rod or bar 37 by the action of the cams 45 and 46 on the fingers 47. The rod or bar 37 being traversed by both of the rods 38 causes a reciprocatory movement of the plate 26 about the pivotal supports of the hangers 29. By mounting the hangers 29 on the rods 30 these hangers with parts carried thereby are readily moved by the rack bars 33 and pinions 34 to vary the outlet between the plate 26 and roller 23. The bar 19 and handle 36 may be arranged adjacent to each other so as to be within ready reach of an operator, permitting such adjustments as are desirable. In order to steady the rotation of the cam shaft 42 it is provided with a balance wheel 57.

In laying or repairing roads or for other purposes, the vehicles 1 and 2 are coupled together so that both may move simultaneously under the action of suitable driving power (not shown). Tar or oil of the character usually employed in road building and repairing is deposited on the road-bed from the tank vehicle 1 in advance of the spreader vehicle 2. As the two vehicles progress, crushed stone or other suitable material carried by the vehicle 2 is placed in the hopper at the upper portion of the boards or plates 4 and gravitates onto the shutter 13, and falls therefrom through the chutes 10 and 20 to the roller 23 and plate 26, again falling through the space between the roller 23 and plate 26 onto the road-bed where the tar or oil has already been deposited, the fine material being evenly and thinly distributed by the reciprocatory movement of the plate 26 and the rotary movement of the roller 23. The sides 7 and ends 5 and 6 of the hopper slant toward each other while the corresponding parts of the chute 10 flare so that there is no danger of the material catching or clogging in the chute 10. The door or side 21 of the chute 20 provides convenient means whereby the interior of the chute 20 may be inspected at any time and may be cleared of obstructions should such occur.

What is claimed is:—

1. In a machine for spreading crushed stone or other material, a hopper for the material to be spread, means at the discharge end of the hopper for regulating the quantity of material discharged, a chute leading from the discharge end of the hopper and expanding therefrom, and separate agitating and feeding means associated to extend across and constitute the bottom of the chute.

2. In a machine for spreading crushed stone or other material, a receptacle thereon for material, means for controlling the discharge of the material from the receptacle, and means underlying the controlling means and comprising separate agitating and spreading means disposed laterally with respect to each other, with the spreading means at one side of the agitating means and rotatable on an axis crosswise of the machine, and the agitating means being reciprocable crosswise of the machine and located with relation to the spreading means to constitute the major portion of a support, for the material formed, by both the agitating and spreading means.

3. In a machine for spreading material comprising a vehicle, a hopper for receiving the material, said hopper tapering downwardly at the sides and ends, a chute structure below the hopper and expanding downwardly at the sides and ends, and separate agitating and spreading means, together constituting a closure for the wide end of the chute and adjustable with respect to each other to provide a long narrow opening for the material extending laterally of the machine.

4. In a machine for spreading material, a receiving hopper for the material tapering downwardly at the sides and ends, a chute structure below the hopper expanding downwardly at the sides and ends, and agitating and spreading means at the discharge end of the chute structure, said chute structure having a door at one side adjacent to the spreading means for rendering the interior of the chute and the spreading means accessible at will.

5. In a machine for spreading material, a chute structure for directing the material, and spreading means at the discharge end of the chute structure, comprising a roller and a plate associated therewith, with the roller and plate constituting the bottom of the chute structure, the plate forming the major portion of the bottom of the chute.

6. In a machine for spreading material, a chute structure, a grooved roller, and a toothed plate associated with the grooved roller and spaced therefrom at the toothed edge of the plate, said plate and roller constituting the bottom member of the chute structure.

7. In a machine for spreading material, a chute structure, a circumferentially grooved roller located at the discharge end of the chute near one side thereof, and a reciprocable toothed plate having the teeth presented toward the grooved roller, said plate and roller together constituting the bottom of the chute structure, and means for reciprocating the plate.

8. In a machine for spreading material, a chute structure, a roller at the bottom of the chute structure near one side thereof, a plate associated with the roller and provided with hangers on which the plate may be reciprocated lengthwise of the roller, and means carrying the hangers for adjusting the plate and hangers toward and from the roller.

9. In a machine for spreading material, a chute having a peripherally grooved roller at the discharge end of the chute near one side thereof, a plate associated with the roller and having teeth on the edge presented toward the roller, and hangers supporting the plate at the ends thereof.

10. In a machine for spreading material, a chute, a peripherally grooved roller at the discharge end of the chute near one side thereof, a plate having teeth along one edge presented toward the roller, the plate and roller constituting the bottom of the chute, pendent hangers carrying the plate by the ends of the latter, means for reciprocating the plate lengthwise of the roller, and means for adjusting the hangers and plate toward and from the roller.

11. In a machine for spreading material, a chute, a peripherally grooved roller at the discharge end of the chute near one side thereof, a plate having teeth along one edge presented toward the roller, the plate and roller constituting the bottom of the chute, pendent hangers carrying the plate by the ends of the latter, means for reciprocating the plate lengthwise of the roller, and means for adjusting the hangers and plate toward and from the roller, said last-named means comprising rack bars, each carrying a hanger, and connected pinions engaging the rack bars and rotatable to actuate said rack bars.

12. In a machine for spreading material, a rotatable grooved roller, a plate associated with the roller and having a toothed edge presented toward the roller, pendent hangers carrying the plate at the ends thereof, and means for reciprocating the plate comprising a reciprocable bar connected to the plate and rotatable cams engaging the bar.

13. In a machine for spreading material, comprising a chute structure for the material, a roller located at the lower end of the chute, a plate associated with the roller and also located at the lower end of the chute, the plate and roller constituting the bottom of the chute structure, pendent hangers for the ends of the plate, a cam shaft and cams for reciprocating the plate, driving connections between the cam shaft and roller, and means for driving the cam shaft.

In testimony that we claim the foregoing as our own, we have hereto affixed our signatures.

WILLIAM O. KING.
JOSHUA R. KING.

Witnesses:
R. W. FRANCE,
HENRY DUNSKEE.